Jan. 29, 1963 V. A. WILLOUGHBY 3,076,183

SKEW CORRECTION DEVICE FOR SENSING A CODED DATA BEARING MEDIUM

Filed May 7, 1959 2 Sheets-Sheet 1

VICTOR A. WILLOUGHBY
INVENTOR.

BY R. Frank Smith
Lloyd F. Seebach
ATTORNEY & AGENT

VICTOR A. WILLOUGHBY
INVENTOR.
BY R. Frank Smith
Lloyd F. Seebach
ATTORNEY & AGENT United States Patent Office 3,076,183

Patented Jan. 29, 1963

3,076,183

SKEW CORRECTION DEVICE FOR SENSING A CODED DATA BEARING MEDIUM

Victor A. Willoughby, Rochester, N.Y., assignor to Eastman Kodak Company, Rochester, N.Y., a corporation of New Jersey Filed May 7, 1959, Ser. No. 811,744
1 Claim. (Cl. 340—174.1)

The invention relates to a device for translating coded data arranged on a medium in columns transversely of the medium into electrical signals and more particularly to means which compensates for any out-of-line relationship existing between the medium and the device for reading or sensing the code as the medium is moved with respect thereto.

The use of record cards for receiving coded information which can be punched into or marked on such cards is well-known in the art. For example, the Hollerith card, better known as an IBM card, is capable of receiving or having punched therein, the equivalent of eighty characters, the code representative of such characters being punched or marked in columns tranversely of the card. For this type of card a code individual to the system is utilized. The Remington Rand card is another type of record card which is divided longitudinally with forty-five columns of code in each of the upper and lower halves of the card for a total of a possible ninety characters. This card, however, uses a six-position code in a column to designate the different characters. After the information has once been encoded in the cards, it can be converted to the original characters by various apparatus, such as printers, to a visual representation.

In a card to tape converter, as disclosed in U.S. Patent Application Serial No. 618,005, filed October 24, 1956, now Patent No. 2,957,162, in the name of C. E. Hunt, Jr., the information on the punched cards is transferred to magnetic tape. If the information is encoded by means of the IBM code and a six-position code is to be used, then the code must first be converted to such six-position code before recording on the tape. The conversion step is not necessary when cards already encoded in a six-position code are used. The resulting magnetic tape then contains coded information from a large number of cards which is arranged column by column lengthwise of the tape, each column of code being representative of a particular character. The information now recorded on the magnetic tape can be utilized to operate a printer, computer, or any other device in accordance with the coded information.

As is well known, the tape is moved either continuously or intermittently past a number of magnetic pick-up heads which are usually aligned across the path of tape movement, a pick-up head being provided for each code channel. For a six-position code, six heads are therefore provided, one head being associated with each channel, as well as a head for sensing the gating or sync bits arranged in a separate channel. The gating or sync bits are recorded on the tape in alignment with each column of code, as well as when no code is recorded, and are utilized as a gating means on read-out. In addition the gating or sync channel can be positioned in any relation to the code channels, that is, to either side of the code channels or between any two code channels. In the embodiment of the invention about to be described, the gating channel is located in the center of the tape with three code channels on either thereof.

As the tape is moved past the pick-up heads, each column of code is presented to the heads at the same time. From the channel or channels in which a bit of code has been recorded, the respective head or heads will derive a signal. In this respect, providing the tape and heads are properly oriented, the head detecting the gating bit will derive a signal at the same time one or more of the code detecting heads derive a signal. As stated, this condition can and will occur only when the heads and tape are properly oriented and aligned.

In the event the tape has stretched or shrunk along one side or is skewed with respect to the heads, for example, due to misalignment of the tape guide and/or feed rolls, or the heads are not properly aligned with the tape, then it is possible for the signals derived from the tape to lead and/or lag the gate depending on the prevailing conditions. As a result, the signal derived from the gating or sync bit can be longer be relied on as a gating means for the signal derived from the code bit or bits. In order to overcome this possibility of the gating signal becoming unusuable, the gating signal is delayed for an interval sufficient to ensure that code in any of the channels has been sensed. It is to be understood, of course, that such a delay interval must not permit the detection of code in the next column to be sensed or read. If such a condition should exist, then the orientation of the head and tape is such as to provide incorrect reading or sensing of the tape. It is with correction of and allowance for this former possible skew relationship of the tape and heads that the present invention is concerned.

The primady object of the invention is, therefore, to provide a means for permitting a skew relationship to exist between the medium being sensed or read and the sensing means whereby presence of a code bit or bits in a column is gated only after a predetermined interval.

Another object of the invention is to provide a device for sensing or reading a medium having code arranged in columns transversely of the medium and a gating mark aligned with each code column in which the signal derived from the gating mark is delayed to ensure that all code bits in the same column have been sensed.

And yet another object of the invention is to provide a device for sensing or reading a medium having code arranged in columns transversely of the medium and a gating mark associated with each code column in which the signal derived from the gating mark is delayed for an interval before gating and checking against the signals derived from the code bits of the associated column to ensure that the presence of all code bits has been detected.

Reference is now made to the accompanying drawings wherein like reference numerals and letters designate like parts and wherein.

Figure 1:
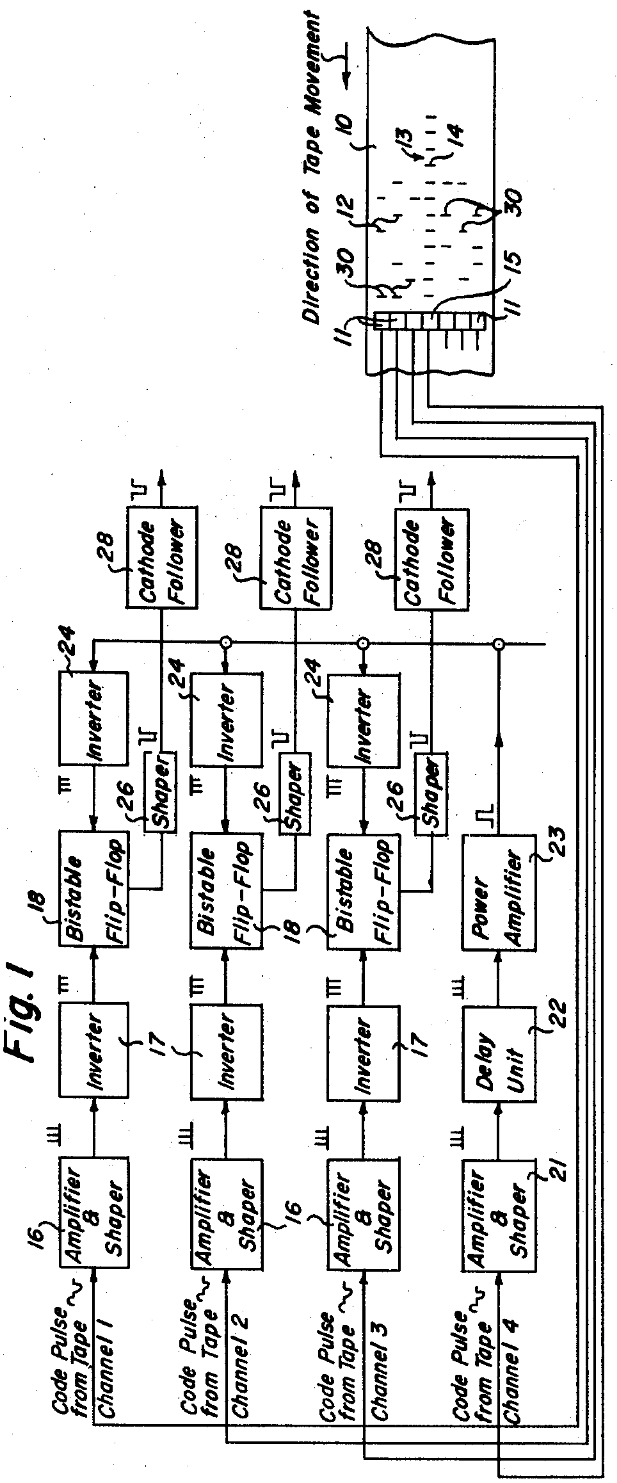
FIG. 1 is a diagrammatic representation of a coded tape movable with respect to sensing or reading heads associated with the code channels of the tape and of the circuitry associated therewith.
Figure 4:
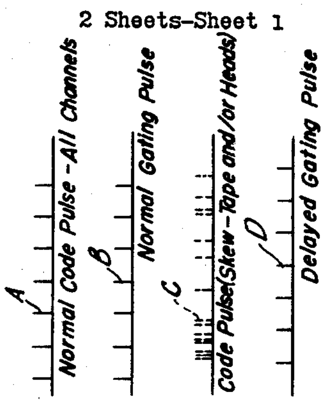
FIG. 4 is a diagrammatic representation of the timing of the code and gating pulses.
Figure 2:
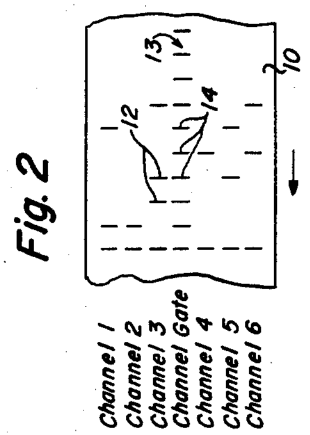
FIG. 2 is a plan view of a piece of tape and discloses the relationship of the code and gating channels.

With reference to FIGS. 1, 2 and 4 of the drawings, tape 10 is moved continuously past and under magnetic pick-up heads 11 at a uniform rate. As shown in FIG. 2, tape 10 is a magnetic tape on which areas 12 have been previously recorded and from each of such areas heads 11 are capable of deriving an electrical signal as is well known in the art. Gating channel 13 is arranged centrally of the tape and comprises equally spaced areas 14 which are detected by head 15. Three code channels 30 are arranged on each side of the gating channel 13, the six code channels providing the six areas for representing characters based on a six position code. Each character is, therefore, represented by one or more of areas or bits 12 arranged in a column across the tape and aligned with a gating area or mark 14. One or more bits 12 aligned with a bit 14 comprises a character and if no bits 12 are aligned with a bit 14, a space or blank is then designated. A bith 14 will be and is recorded in every possible code column of the tape.

Since code bits 12 and gating bit 14 are aligned, as shown in FIG. 2, and if heads 11 and 15 and tape 10 are correctly and properly oriented, then as the tape is moved thereunder, heads 11 will derive a signal from each of those areas 12 in the column thereunder and head 15 will derive a signal simultaneously from the gating bit 14 associated and aligned with the same column. This is shown in FIG. 4 wherein the code pulses A are shown as a single pulse to indicate their derivation from simultaneous detection of one or more bits 12 in the same column as well as being detected and occurring simultaneously with the normal gating pulse B. So long as this condition exists, there is no need for any corrections. However, for the reasons mentioned above, this ideal condition of detection is not always prevalent.

Figure 3:
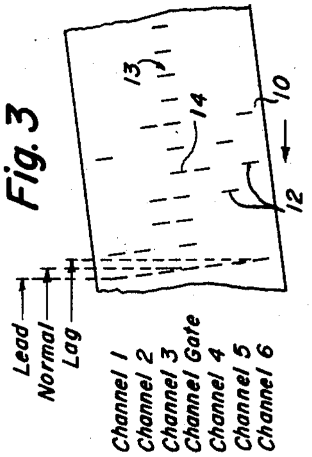
FIG. 3 is a plan view of a piece of tape tilted or skewed at a small angle to the horizontal and shows the lead and lag in detection of the code in the channels.

With reference to FIG. 3, tape 10 is shown tilted or skewed to the horizontal. The conditions to be described with respect to the tape can also be attained by the heads 11 and 15 as well as combinations of both the tape and the heads. Assuming tape 10 is skewed as shown in FIG. 3 with respect to the heads 11 and 15, then the signals derived from the tape cannot occur simultaneously but will lead and/or lag the gating pulse as shown in FIG. 4 and indicated by pulses C and B. It can be readily appreciated that rearrangement of the channels is not a solution to the problem in that the heads can be tilted about their center or either end, the latter condition increasing the error. Also, if the error arises because the tape has shrunk or stretched along one edge, rearrangement of the channels will not alleviate the situation.

Figure 5:
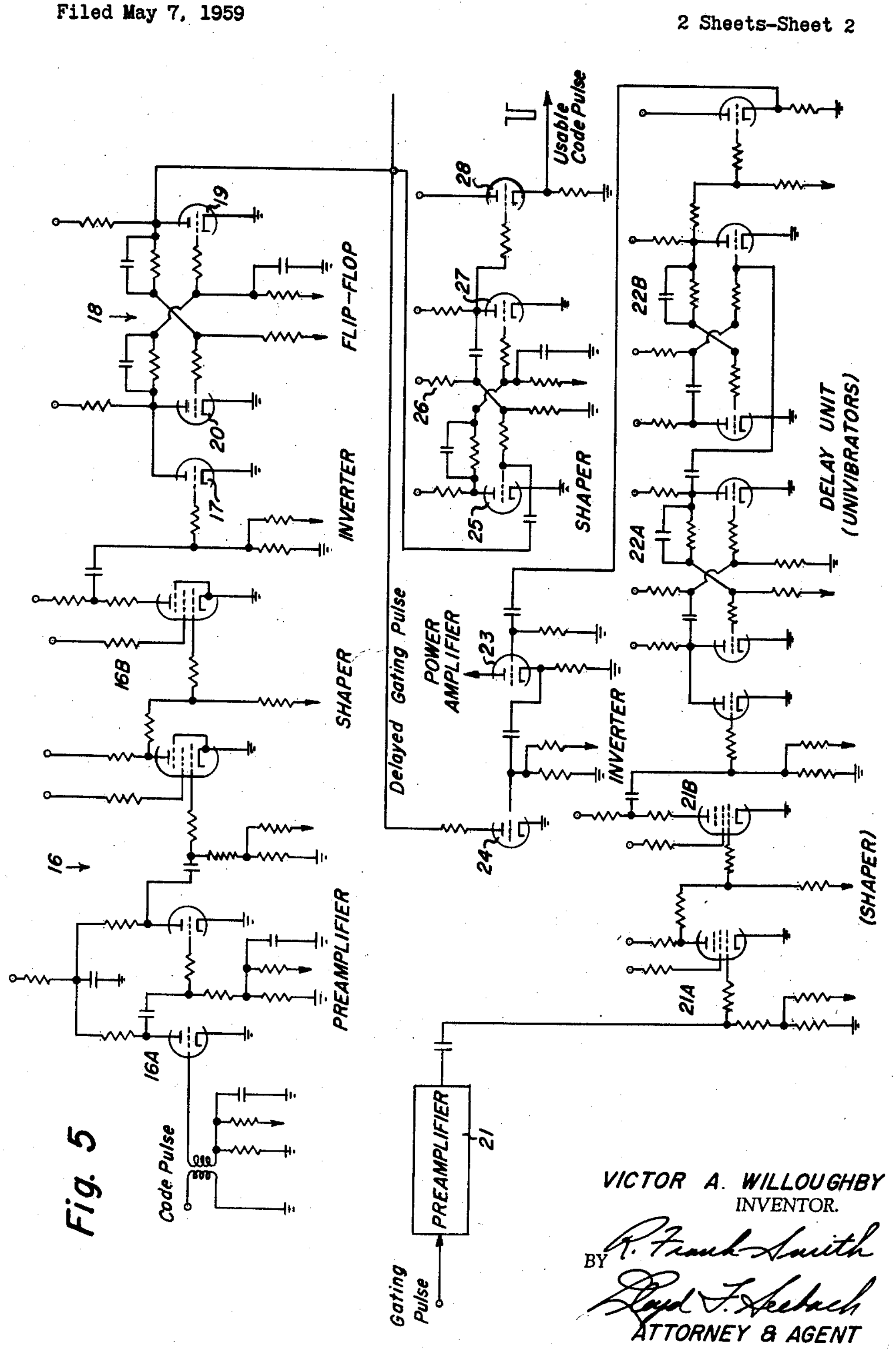
FIG. 5 is a schematic view of the circuitry disclosed by the block diagrams of FIG. 1.

As shown diagrammatically in FIG. 1 and with respect to any code channel, when a code bit is sensed, the pulse derived therefrom is amplified and shaped at 16 by the preamplifier circuit 16A and the shaper circuit 16B which transmits a positive spike to inverter circuit 17. Circuit 17 changes the positive spike pulse to a negative pulse which is applied to the left-hand plate of the bistable flip-flop or trigger circuit 18. Circuit 18, as shown in FIG. 5, is normally conducting on the right hand side, that is, tube 19. The negative pulse applied to the plate of tube 20 causes the circuit to switch and tube 20 remains in a conducting state until triggered by a gating pulse as described hereinafter. Since circuit 18 is bi-stable, it performs, in effect, a temporary storage for the signals or code pulses derived from any one column.

The gating pulse associated with the column being sensed is also amplified by a circuit 21 identical to that for the code pulses and then shaped by circuits 21A and 21B, the latter delivering a positive spike pulse to a delay unit 22 which comprises two capacitor-coupled univibrators, 22A and 22B. As is well known, after a trigger pulse "flips' a univibrator circuit over, it "flops" back after a time ($t$) depending on the coupling capacitor chosen for the circuit. In the present circuits, capacitor and other circuit parameters are chosen so as to give a delay just less than one-half of the time between receipt of the succeding gate pulse. In other words, if the cycle between successive gating pulses is considered to be 360°, then the delay should be less than 180° and preferably of the order of 170°. The delayed gating pulse is then amplified by a power amplifier 23 which can be a cathode follower circuit of the type shown in FIG. 5 and designated by the same numeral. The delayed gating pulse is then applied through an inverter circuit 24 associated with each channel as a negative pulse to the plates of each of tubes 19 simultaneously thereby switching each of the flip-flops 18 in which a code pulse has been retained or stored back to its normally conducting condition. Those flip-flops 18 which are switched back to their normal conducting position by the delayed gating pulse, furnish or transmit a pulse to the grid of tube 25 in their respective monostable trigger circuit 26 for pulse sizing and shaping. As the circuit 26 flips back, the output pulse formed at the plate of tube 27 is applied to the grid of cathode follower 28 which provides an output pulse for subsequent use or storage as the case may be. Inasmuch as the above-mentioned circuits are well known, a description of their various functions and operation is believed not to be necessary.

By delaying the gating pulse, all code pulses derived from a column on the tape can be detected before the pulses are released simultaneously as they would be if proper alignment of the heads and/or tape were completely assured. This condition is shown in FIG. 4 wherein the code pulses C lead and/or lag the normal gating pulse B. Since gating pulse B is delayed approximately one-half cycle, the delayed pulses D permit the code pulses to be read into flip-flops 18 over an interval, thereby ensuring that all the code bits representative of a character in a column have been detected. With the arrangement described above, any condition of the tape with respect to the heads or of the heads with respect to the tape provides an output of simultaneous code pulses from the cathode followers 28 for any further designated use.

While the invention has been described with respect to coded magnetic tape having a gating channel thereon, it is to be understood that the gating pulse can also be derived from a combination of the code channels or from another source. Also, the invention is applicable to deriving signals from record cards which can be skewed in the same manner as a tape when they are moved with respect to the sensing device.

Since many modifications of the above-described embodiment of the invention will be apparent to those skilled in the art, the invention is not to be limited to the described disclosure but is defined by the appended claim.

Having now particularly described my invention, what I desire to secure by Letters Patent of the United States and what I claim is:

In apparatus utilizing a medium having code areas arranged thereon in spaced columns transversely of said medium and in a plurality of channels longitudinally of said medium and a timing channel parallel to said plurality of channels and consisting of equally spaced areas designating each data column, the combination comprising means arranged transversely of said medium for sensing the code areas in each data column and the area designating the data column as said medium is moved with respect thereto, said sensing means generating an electrical signal from each of said code areas in a data column and from said timing channel area, circuit means connected to each of said sensing means associated with said plurality of channels and to said sensing means associated with said timing channel and responsive to said electrical signals for providing amplified output signals, a delay circuit means including at least one monostable univibrator and an amplifier circuit connected in series, said delay circuit means being connected to said circuit means associated with said timing channel and responsive to said output signals therefrom for generating a series of periodic gating pulses delayed for substantially one-half of the period of the electrical signals derived from the areas in said timing channel, and a plurality of registers corresponding in number to said plurality of channels, each of said registers including a flip-flop circuit connected to one of said circuit means and responsive to an amplified output signal therefrom for being triggered from an initial state to a signal storage state, the flip-flop circuits of said registers being triggered to said storage state in the order said electrical signals are derived from said code areas in a data column and being responsive to each of said delayed gating pulses whereby said flip-flop circuits in said signal storage state are switched simultaneously to said initial state, a monostable trigger circuit capacity-coupled to said flip-flop circuit and responsive to the output signal emitted by said flip-flop circuit when it is switched to said initial state for generating an output pulse, and a cathode follower circuit responsive to the output signal emitted by said monostable trigger circuit for generating a usable output pulse, the number of concurrent usable output pulses generated by said registers corresponding to the number of flip-flop circuits in said signal storage state.

References Cited in the file of this patent

UNITED STATES PATENTS

| | | |
|---|---|---|
| 2,760,063 | Andrews | Aug. 21, 1956 |
| 2,793,344 | Reynolds | May 21, 1957 |
| 2,813,259 | Burkhart | Nov. 12, 1957 |
| 2,817,829 | Lubkin | Dec. 24, 1957 |
| 2,850,234 | Bartelt et al. | Sept. 2, 1958 |
| 2,881,415 | Dumousseau et al. | Apr. 7, 1959 |
| 2,894,249 | Hughes et al. | July 7, 1959 |
| 2,906,999 | Wright | Sept. 29, 1959 |
| 2,907,989 | Guerber | Oct. 6, 1959 |

FOREIGN PATENTS

| | | |
|---|---|---|
| 785,879 | Great Britain | Nov. 6, 1957 |

OTHER REFERENCES

Principles of Radar, by Reintzes et al., McGraw-Hill, 1952, page 104.